Figure 8:
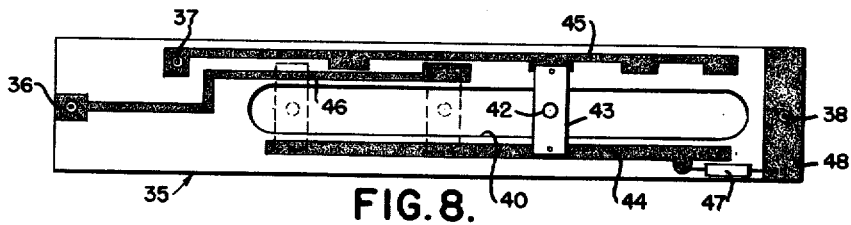

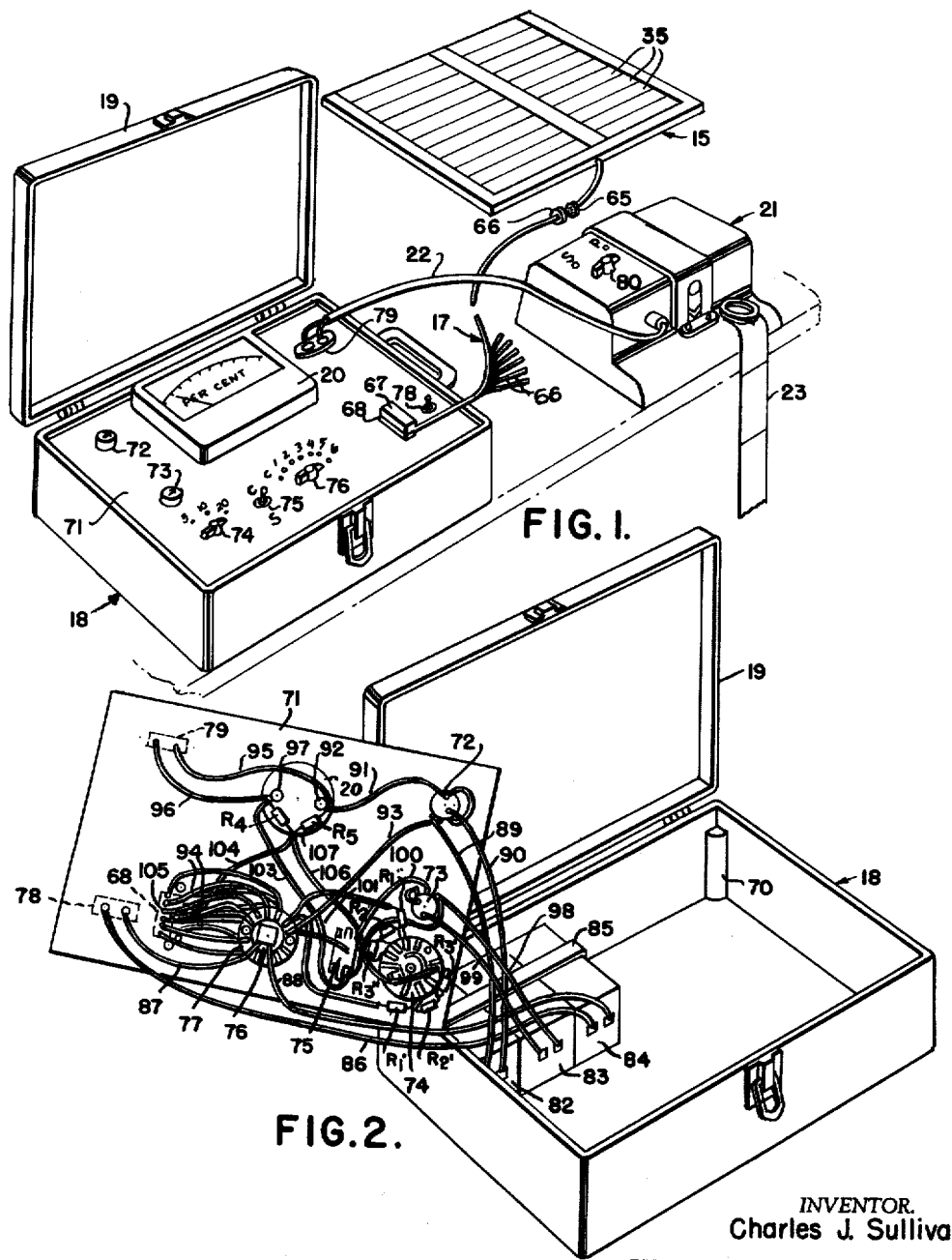

Oct. 10, 1961      C. J. SULLIVAN      3,003,259
ELECTRICAL EDUCATIONAL TESTING AND SCORING SYSTEM
Filed July 24, 1957      3 Sheets-Sheet 2
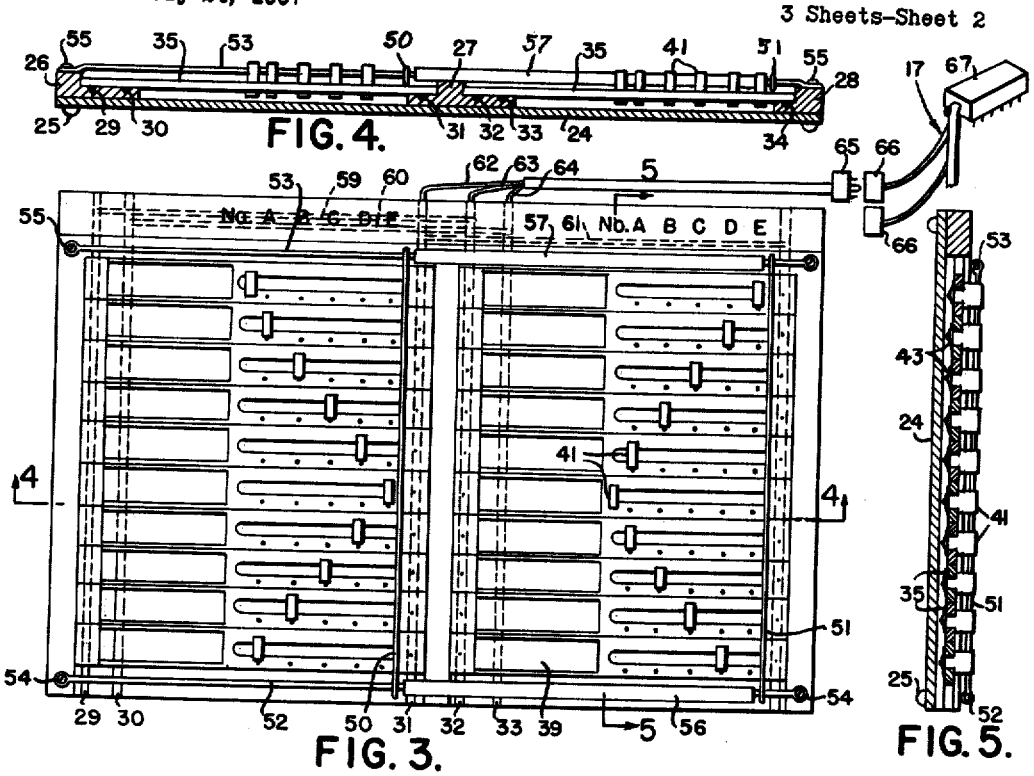
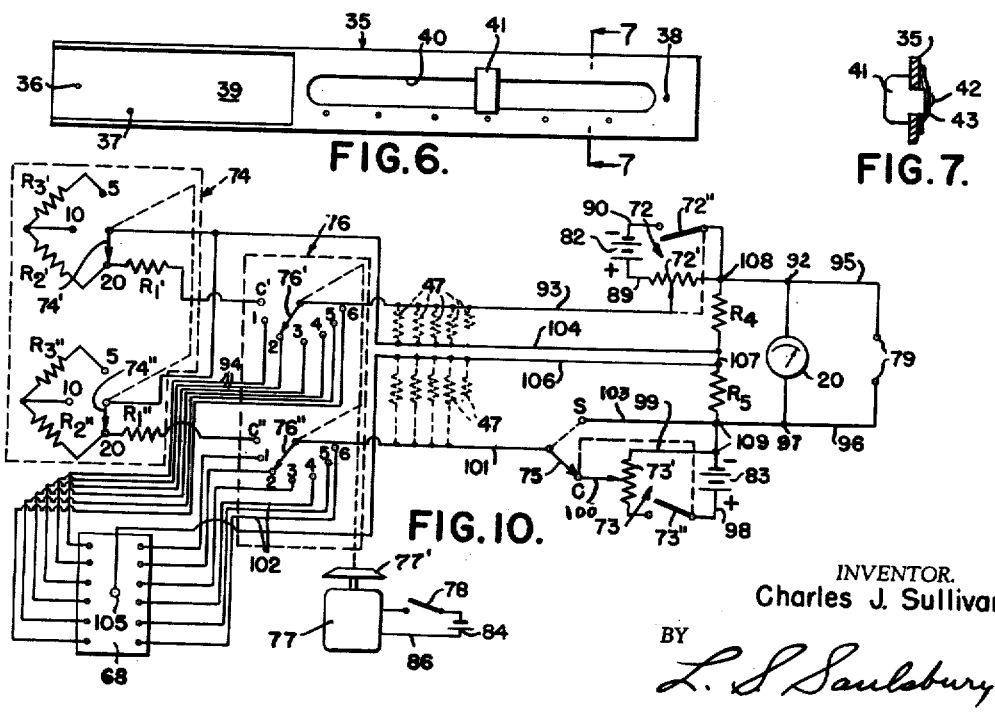
INVENTOR.
Charles J. Sullivan
BY
L. S. Saulsbury
ATTORNEY Oct. 10, 1961

C. J. SULLIVAN 3,003,259

ELECTRICAL EDUCATIONAL TESTING AND SCORING SYSTEM

Filed July 24, 1957

3 Sheets-Sheet 3

*INVENTOR.*
Charles J. Sullivan

BY
*L. S. Saulsbury*

ATTORNEY

United States Patent Office 3,003,259
Patented Oct. 10, 1961

3,003,259
ELECTRICAL EDUCATIONAL TESTING AND SCORING SYSTEM
Charles J. Sullivan, 40 Albemarle Place, Yonkers, N.Y.
Filed July 24, 1957, Ser. No. 673,905
2 Claims. (Cl. 35—48)

This invention relates to an electrical educational testing and scoring system.

It is the principal object of the present invention to provide an electrical educational testing and scoring system that requires no paper or pencil for the taking of the test and in which the drudgery of correcting the papers by the examiner is completely eliminated and in which the score of the test is given immediately.

It is another object of the invention to provide an electrical educational testing and scoring system in which the students indicate their choice of answers to a list of questions placed either on the board forming a part of the system or on the blackboard or question paper whereby the examiner or proctor can by selectively turning a switch read from a meter either while the examination is being taken, or when completed, the score advanced by the student.

It is still another object of the invention to provide in an electrical testing and scoring system, a testing board made up of an assemblage of individual slide switch question answering or test elements corresponding in number to the number of questions on the assemblage, and in which the elements can be arranged differently on the boards of the different students thereby making it impossible for one student to view the board of the other student to ascertain the position of his slide buttons or answers, the test elements thus being interchangeable to prevent cheating.

It is a further object of the invention to provide in a testing board for recording the answers of an examination that is composed of a plurality of slide switches having buttons projecting upwardly above the surface of the board, a gang slide arrangement by which all or any bank of the buttons can be returned to their "No Answer" positions together.

It is a still further object of the invention to provide an electrical educational testing and scoring system in which an adjustment for scoring can be made such that, from the system, the students can be given a score either dependent upon the number of correct answers or a score of a different amount where an additional penalty is inflicted for an incorrect answer to eliminate guess answers, whereby with provision for calibrating the system, just about all different methods of scoring student examinations can be had by a mere flick of a switch thereby making possible the testing of the student in both simple and complex manners.

It is a still further object of the invention to provide an electrical educational testing and scoring system in which the number of questions used in the examination can be changed, and the system recalibrated by a mere flick of the switch.

It is a still further object of the invention to provide an electric educational testing and scoring system in which provision is made in the score indicator device with the aid of a timer, for automatically imposing upon a time graph chart the scores made on the examination so that a comparison of the manner and aptitude in which the students answering questions can be compared with one another, and where a permanent record is to be kept and whereby, if desired, the proctor's presence to take the score is unnecessary.

It is a still further object of the invention to provide an electrical educational testing and scoring system employing a graph chart score indicator having timing mechanism so that the score of the students can be periodically or continuously taken and analyzed and where progress can be compared against time for the group being examined.

It is a still further object of the invention to provide an electrical educational testing and scoring system in which the student can physically only give one answer to a question thereby eliminating secondary answers.

Other objects of the invention are to provide an electrical educational testing and scoring system in which the device employed is simple to operate, compact, portable and self-powered, light in weight, universally adapted to all types of tests, allows the teacher to spend more time constructively for preparation of questions rather than with routine correcting of papers, allows the student to be examined more often, accurate, durable, allows for quick review of the right or wrong answers by the student so that the student may know his weaknesses immediately, may be made into the form of a game with minor variations, readily adapted for purposes other than scoring of tests, effective and efficient in use.

Figure 11:
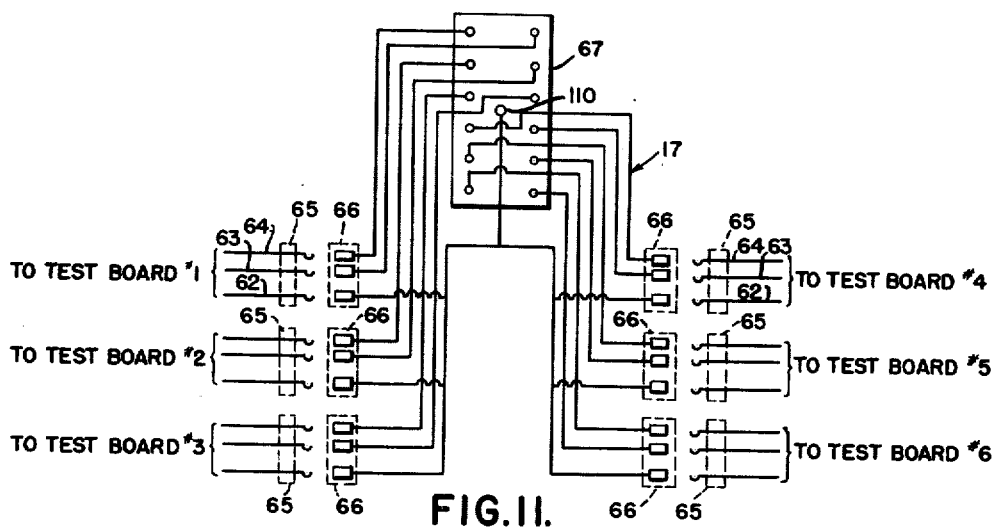
Figure 12:
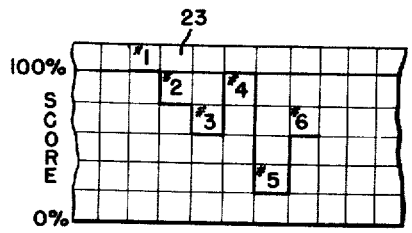
Figure 9:
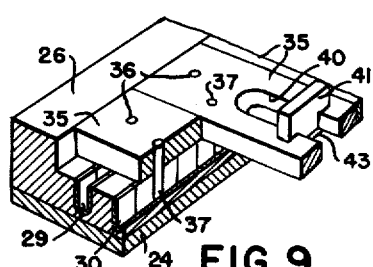
Figure 13:
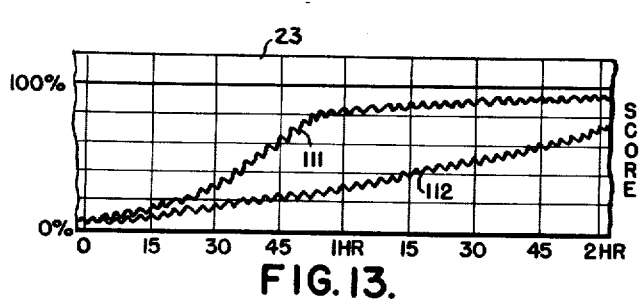

For a better understanding of the invention, reference may be had to the following detailed description taken in connection with the accompanying drawing, in which FIGURE 1 is a perspective view of the testing and scoring devices for carrying out the present testing and scoring system including the calibrating and indicating box, student's testing board and time graph from which graph paper records can be taken, FIG. 2 is a perspective view of the calibrating and indicating box with the switch and meter instrument supporting board removed from the box and the wiring on the underside thereof with the wiring in the box being displayed, FIG. 3 is a top plan view of the student's testing board with the bars for resetting the switch knob in unison to the "No Answer" positions and retracted to their out-of-use positions, FIG. 4 is a longitudinal sectional view of the student's testing board as viewed on line 4—4 of FIG. 3, FIG. 5 is a sectional view of the student's testing board as viewed on line 5—5 of FIG. 3, FIG. 6 is an enlarged top plan view of one of the test question elements, FIG. 7 is a sectional view of one of the test elements taken on line 7—7 of FIG. 6, FIG. 8 is a bottom plan view of one of the test elements, FIG. 9 is a fragmentary perspective view of one end of the test board cut away to show the plug connection of the test element with the serrated spring contact bus bars of the test board, FIG. 10 is a wiring diagram of the calibrating scoring box, FIG. 11 is a wiring diagram of a wire harness which connects the test boards to the calibrating and scoring box, FIG. 12 is a graph chart taken from the graph chart recorder with a fast timer base to show individual scores, and FIG. 13 is a graph chart taken from the graph chart recorder with a slow time base equal to the length of the test for the purpose of group analyzation.

Referring now generally to FIGS. 1 and 2, 15 represents a test board that has a plurality of slide test elements 35 arranged thereon in vertical rows of say ten elements to a row and which is located at each student's desk and connected by a wire harness 17 with a calibrating and scoring meter box 18 having a cover 19 and a meter 20 on which the score of the student is read directly in percentage. If a permanent record of the score is desired a time graph 21 is connected by a cable 22 with the meter box 18. A graph paper 23 is delivered from the time graph that may bear the student or group score.

The test board 15 comprises a base 24 having foot pads 25 thereon for supporting the testboard upon a horizontal surface or desk along the top of which there extends parallel to one another bus bar supports 26, 27 and 28, the bus bar support 27 lying intermediate the length of the test board and of the supports 26 and 28. The support 26 has two parallel bus bars 29 and 30, the intermediate support 27 has three parallel bus bars 31, 32 and 33 and the support 28 has a single bus bar 34. The supports 26 and 27 serve to support a plurality of test elements 35 which respectively have at their left end contact pins 36 and 37 adapted to respectively engage the bus bars 29 and 30 of the support 26 and a contact pin 38 at the right end adapted to engage the bus bar 31 of the intermediate support 72. At the right of the test board, there can be supported another vertical row of test elements 35 in which the pins 36 and 37 will engage the respective bus bars 32 and 33 of the support 27 and the pin 38 at the opposite end of the element will engage the bus bar 34 of the support 28. Each of the test elements represents a single question of multiple choice answer form and any member of these test elements can be placed on the test board. The test elements can be placed in the rows differently on the board thereby preventing the students from quickly viewing any correct answers upon a neighbor's board. The questions can be in brief form on the element on a card or piece of paper and fastened to the test element either by providing a slotted frame about space 39 on the element to slideably receive slips of paper bearing the questions or by adhering the slips of paper to the test element surface.

It will be understood, however that the questions can be placed on a blackboard or handed to the student in paper form with the elements prearranged to suit the answers for those questions. The element 35 has an elongated slot 40 in which a hand knob 41 slides. Fastened to the underside of the knob 41 by a screw 42 is a spring bridging contact 43 that overlies the edges of the elongated slot 40 for engagement with printed contact strips 44, 45, 46 on the bottom face of the element, remaining always in contact with the strip 44 but selectively in contact with strips 45 and 46 or in case of a "No Answer" out of contact with either of these latter strips. There are six positions to which the knob 41 can be moved beginning with a "No Answer" position in which no contact is made and the circuit is left open and five remaining positions A, B, C, D, and E, one of which connects to the correct answer terminal pin 36, the remainder of which will connect to the incorrect answer terminal pin 37. The position of the correct and incorrect answer is predetermined and may occur in any of the five positions. As shown in FIG. 8 the spring contact 43 is located on an "Incorrect Answer" position so that the printed strips 44 and 45 are bridged electrically placing a resistor 47 in series with an end contact strip 48 from which pin 38 extends. The contact strip 45 has the contact pin 37 whereby the resistance 47 is in effect placed in series between bus bars 30, 31 of the left row of test elements or between bus 33 and 34 of the right row of test elements. If a correct answer had been selected the contact 43 would have been moved to bridge contact strips 44 and 46 as illustrated by dotted line in FIG. 8 so that resistance 47 would have been placed between contact pins 36 and 38 or when the elements are placed on the board, between bus bars 29 and 31 or 32 and 34. At the "No Answer" position on the test element the spring contact 43 will engage only the strip 44 wherein an open circuit results.

With the test elements in place over the bus bar supports and held thereon against upward displacement by the engagement of the contact pins with the spring contact bus bars, the knobs 41 project upwardly above the surfaces of the elements so that they may be engaged by laterally movable resetting bars 50 and 51 that may respectively engage the knobs of the respective left and right rows of test elements. These slide bars 50 and 51 are respectively supported upon and between parallel supporting bars 52 and 53 that extend substantially the full length of the test board and are fastened at their ends by screws 54 and 55 to the bus bar supports 26 and 28. Between the bars 50 and 51 and on the guide bars 52 and 53 are sleeves 56 and 57 which enables all of the knobs of all of the test elements to be moved to the left and to their "No Answer" position when the single bar 51 is moved to the left and the ends of the sleeves 56 and 57 move the bar 50. If it is desired to move the knobs in the left row without moving the knobs in the right row, this can be done by moving the bar 50 to the left alone.

The bus bars 29, 30, 31, 32, 33 and 34 as better shown in FIG. 9 are of a continuous channel-like formation made of spring contact material and vertically slit at intervals therealong in order to insure good electrical contact with the contact pins of the test elements and to hold them better against upward displacement from the board. The bus bars 29, 30 and 31 of the left row are connected by wires 59, 60 and 61 in common with the respective bus bars 32, 33 and 34 of the right row. Extending from the respective bus bars 31, 32 and 33 are respective cable wires 62, 63 and 64 that are joined to a plug 65 by which the individual test board can be connected by a coupling plug 66 of the harness 17 with the calibrating and scoring box 18 by a multiple plug 67, that engages with a multiple contact socket 68 on the box 18.

As best illustrated in FIGS. 1, 3 and 11 it will be seen that other plugs 65 of other test boards can be connected with the other plugs 66 of the wire harness 17. It should be borne in mind that this harness 17 while showing but six plugs 66 may accommodae a larger number of plugs 66 for connection of additional testing boards and that this harness may extend loosely over the floor area from the student's desk to the instructor's desk or may be embodied within the building structure and the harness as a permanent installation.

The calibrating and scoring box has supported upon posts 70 therein, an instrument and switch panel 71 in which the scoring meter 20 and the contact socket 68 are supported. The instrument panel further has a simple test calibration potentiometer 72′ with an off and on switch 72″ embodied therein, a complex test calibration potentiometer 73′ with an off and on switch 73″ embodied therein, a switch 74 for adjusting the system to the number of questions desired to be answered by students for any given examination, a simple-complex selector switch 75, and an individual test board selector switch 76 that may be driven by an electric motor 77 controlled by a switch 78 and having a reduction gear 77′. The motor 77 is used when automatic scoring by means of a graph chart recorder is connected by its cable 22 to an external metering connection post 79. The speed of the movement of the graph chart 23 of the recorder 21 is controlled by speed control switch 80 of the recorder 21.

In the box 18 are three dry cell batteries 82, 83 and 84. These batteries are held in place in the box by a bracket 85. The batteries 82 and 83 are disposed to power the metering circuit and are arranged therein in kicking polarity to each other while the battery 84 is an independent source of current that through switch 78 and wires 86, 87 and 88 drives motor 77.

From the battery 82 there extends wires 89 and 90 to potentiometer 72′ and switch 72″ and creates thereby variable power supply for simple testing. The potentiometer 72′ and switch 72″ taken with the battery 82 constitutes a variable voltage power supply 72 for calibrating the simple testing circuit. Wire 91 extends from the power supply 72 to the terminal post 92 on the meter 20 and another wire 93 extends from the potentiometer 72′ to contact arm 76′ of the individual test board selector switch 76 through any one of a plurality of wires 94 with socket 68 to which the testing boards are connected through the wire harness 17.

Wires 95 and 96 extend from meter terminal 92 and meter terminal 97 to the external metering connection posts 79. Battery 83 is connected by wires 98 and 99 to potentiometer 73' and switch 73" to create a variable power supply 73 of opposite polarity to power supply 72 for use in complex testing. The potentiometer 73' and switch 73" taken with the battery 83 thus constitutes a variable voltage power supply 73 for calibrating the complex testing circuit.

The power supply 73 is inserted in the circuit when simple complex switch 75 is placed in a complex position C and the battery sources are thereby placed in bucking relationship with each other. The potentiometer 73' is connected with the simple-complex selector switch 75 by a wire 100. The switch 75 in turn is connected by a wire 101 with individual test board selector switch 76 and switch arm 76" which are connected through one of wires 102 with socket 68. The switch 75 is connected to the meter for simple testing when the switch is thrown to the dotted line position in FIG. 10 and to terminal 97 on the meter by a wire 103.

The switch 74, which is used for setting the metering circuits to the number of questions on the test, is inserted in the circuit when the switch arm 76' and 76" of switch 76 are turned to the calibrate positions C' and C". The switch 74 has two gangs 74' and 74", each gang having respectively three positions "5," "10" and "20" representing the number of questions of the test. While these number of questions have been selected as a typical number of questions for examinations it will be understood that the circuit can be arranged for any number of questions, more or less.

Resistors R1', R2' and R3' on gang 74' of the switch 74 are equal respectively in value to resistors R1", R2" and R3" of the gang 74", but the individual resistances of a given gang are not necessarily equal to each other.

With a twenty question test, R1' and R1" are equal to one-twentieth of the value of the test element resistor 47. With a ten question test switch 74 is set so that the combined resistances of R1' and R2' and of R1" and R2" are equal to one-tenth of the test element resistor 47. For a five question test switch 74 is set so that the total resistors R1', R2' and R3' and R1", R2" and R3" are equal to one-fifth of the test element resistor 47.

The switch arms of the gang 74' and 74" are connected in common by a common wire 104, 107 and 106 to a common terminal 105 of multiple switch socket 68 and through the junction line 107 of a matrix-like circuit consisting of resistors R4 and R5 which are of equal value and are in turn respectively connected to power supply potentiometer 72 and power supply potentiometer 73 at respective terminals 108 and 109 and across which is connected the scoring meter 20 and external metering connection posts 79.

The terminal 105 of the socket 68 receives common contact pin 110 of plug 67 of harness 17, FIG. 11 through socket 66 and plug 65 connects with the common wire 62 of each test board.

As shown the system is arranged for twenty questions and there are disposed on the board 20 test elements arranged in two vertical rows. Associated with each of the elements are multiple choice questions and the student moves the knob 41 to his choice of the answer. The resistances 47 of the individual test elements are accordingly placed in effect and as illustrated in FIG. 10 to one side or the other of wires 104 and 106 on the diagram shown in FIG. 10 depending on whether the given answer is correct or incorrect, the resistances for the correct answers will appear between the wire 104 and wire 93 while the incorrect answers will place resistances between wire 106 and wire 101. The number of correct answers determines the total resistance placed between wires 104 and 93. The total resistance of the resistances 47 are inversely proportional to the number of correct answers given. This total resistance determines the current that flows in a series circuit consisting of the total resistance, power supply 72, resistance R4. The voltage developed across R4 is measured by the meter through resistance R5 and converted directly to percentage by the scale on the meter. The switch 75 is placed in a simple testing position as indicated by the dotted line shown in FIG. 10, and upon the contact S. With simple testing a reading is given of the number or percentage of the total answers which have been given correctly and an additional penalty is inflicted for the incorrect answers. With the system arranged for twenty questions the student will receive five percent for each correct answer and if he has answered fifteen questions correctly he will receive a grade of seventy-five percent. If a test of ten questions is used the student would receive ten percent for each correct answer. For a five question test he would receive twenty percent for each correct answer.

If it is desired to arrange the system for complex testing wherein an additional penalty is to be given for a question incorrectly answered, the switch 75 has its contact arm swung to the full line position shown in FIG. 10 on its contact C. This type of test is used where guessing by the student is to be discouraged. The student, therefore, if he is not sure of the answer will leave the knob 41 in the "No Answer" position which leaves resistors 47 of the test elements out of the circuit entirely, neither adding or subtracting from the total resistance. Moving switch 75 to complex testing position C puts power supply 73 which is of opposite or bucking polarity to the power supply 72 in the circuit. Thus, the number of resistors 47 having the correct answers and placed between the wires 104 and 93 and the number of resistors 47 bearing the incorrect answers placed between the wires 106 and 101 will determine the current that flows through matrix-like circuit R4 and R5 and determine the voltage difference between points 108 and 109 and will be indicated on scoring meter 20 directly in percentage since R4 equals R5. The amount of the penalty imposed upon each incorrect answer can be adjusted by regulating the potentiometer 73' of the power supply 73. Assuming on a simple test of twenty questions a student scores 15 correct answers and five incorrect answers he will receive a score of seventy-five percent, but on a complex test where an additional five point penalty is to be exacted for an incorrect answer he would receive fifty percent. If the five incorrectly answered questions had not been answered at all and knobs 41 were allowed to remain in their "No Answer" position he would still have received seventy-five percent.

If it is desired to vary the additional penalty inflicted to a greater or lesser amount, the potentiometer 73' may be adjusted accordingly.

The potentiometer 72' of the power source 72 is used for calibrating the simple testing circuit. By turning switch 76 to the calibrating position C' and C" and turning switch 74 to the number of questions desired on the test as at "20," power supply 72 is adjusted to give a one hundred percent reading on the scoring meter 20 since the resistance inserted by the calibrating circuit is equal to the total resistance of all of the test element resistors 47 in parallel. After calibrating the circuit for simple testing it may be calibrated for complex testing by throwing the switch 75 to the "C" position thereby inserting power supply 73 in the circuit and adjusting its potentiometer 73' to align the needle of the scoring meter 20 upon the percentage reading, that is, assuming an equal penalty is to be scored as for an incorrect answer.

With this setting of the needle on the zero reading, automatically an additional penalty is given for a twenty question test, an amount of five percent for each question incorrectly answered thereby giving the student five points for one correctly answered question, minus five points for a question not answered, and minus ten points for a question incorrectly answered. If the meter is to be calibrated for only a two percent additional penalty the adjustment is made by the potentiometer 73' to place the needle at the sixty percent reading rather than the zero. The student would then receive five points for a correctly answered question, minus five points for one not answered and minus seven points for one answered incorrectly.

With the chart recorder connected to the connection posts 29 and the speed control switch 80 turned to a fast speed a scoring pattern such as shown in FIG. 12 will be obtained from which the scores of each of the six students can be taken from the chart. For example, as shown on the graph, students "1" and "4" would have one hundred percent, student "2" would have eighty percent, students "3" and "6" would have sixty percent and student "5" only twenty percent as taken from the graph. If the speed switch 80 of the graph 21 is adjusted to operate as at a slow speed a record of progress made by students during the test showing the average and range versus time will be traced on the graph chart and produce a curve 111 as shown in FIG. 13. With this typical curve 111 the progress of the group was best for the first hour and least for the second hour. Such a curve 111 would indicate that the examination was easy for the group and could have well been terminated at the end of the first hour. If the test were a severe one and not enough time had been given to the students a curve such as 112 might result. Here it would be seen that students progressed slowly throughout the full two hour period and the final score of the entire group was low.

It should now be apparent that there has been provided an electrical educational testing and scoring system in which examinations can be taken easily without the aid of pencil, pen or paper and that the scores of the student can be indicated either during the examination or at the end thereof without the necessity of the instructor having to correct any answer papers.

While various changes may be made in the detailed construction, it shall be understood that such changes shall be within the spirit and scope of the present invention as defined by the appended claims.

What is claimed is:

1. An electrical educational testing and scoring system device comprising a testing board having bus bars and a plurality of electric test elements adapted for the answer of questions of multiple choice and connected to the bus bars, an electrical circuit in the test board including the test elements and bus bars each of said test elements being adapted for supplying a resistance to the electrical circuit upon the element having been adjusted to either a right or wrong answer position and no resistance when left in a no answer position, and a metering circuit means connected to the test board electrical circuit and an external metering recorder member forming a part of the circuit means, a graph recording instrument connected to the external metering recorder terminal member and motor-operated selector switch means in the metering circuit to transmit the correct answer positions of the test element to the graph recording instrument, whereby a graph plotting score against time can be made.

2. An electrical educational testing and scoring system device comprising a testing board having bus bars and a plurality of electric test elements adapted for the answer of questions of multiple choice and connected to the bus bars, an electrical circuit in the test board including the test elements and bus bars, each of said test elements being adapted for supplying a resistance to the electrical circuit upon the element having been adjusted to either a right or wrong answer position and no resistance when left in a no answer position, a metering circuit means connected to the test board electrical circuit and including a meter and variable power sources and said test elements including test knobs elevated from the surface of the board, and means on the test board and engageable with the knobs to simultaneously reset the knobs in unison to their no answer positions.

References Cited in the file of this patent

UNITED STATES PATENTS

| | | |
|---|---|---|
| 2,104,718 | Dougherty | Jan. 4, 1938 |
| 2,349,066 | Witter | May 16, 1944 |
| 2,527,469 | Vernon et al. | Oct. 24, 1950 |
| 2,562,179 | Dorf | July 31, 1951 |
| 2,717,460 | Stibitz | Sept. 13, 1955 |
| 2,720,038 | Clark | Oct. 11, 1955 |
| 2,738,595 | John et al. | Mar. 20, 1956 |
| 2,826,828 | Hamilton | Mar. 18, 1958 |
| 2,877,568 | Bernard et al. | Mar. 17, 1959 |